United States Patent [19]
Griffin et al.

[11] Patent Number: 6,162,472
[45] Date of Patent: Dec. 19, 2000

[54] NUTRITIONAL FORMULA FOR PREMATURE INFANTS AND METHOD OF MAKING

[75] Inventors: M. Pamela Griffin, Charlottesville, Va.;
James W. Hansen, Evansville, Ind.

[73] Assignee: University of Virginia Patent Foundation, Charlottesville, Va.

[21] Appl. No.: 09/283,642

[22] Filed: Apr. 1, 1999

Related U.S. Application Data

[60] Provisional application No. 60/094,399, Jul. 28, 1998.

[51] Int. Cl.[7] ..................................................... A23C 9/127
[52] U.S. Cl. ................................. 426/42; 426/34; 426/61; 426/74; 426/580; 426/801
[58] Field of Search ............................... 426/74, 580, 801, 426/34, 42, 61

[56] References Cited

U.S. PATENT DOCUMENTS

| | | |
|---|---|---|
| 4,216,236 | 8/1980 | Müeller et al. . |
| 4,303,692 | 12/1981 | Gaull . |
| 4,368,204 | 1/1983 | Sato et al. . |
| 4,753,926 | 6/1988 | Lucas et al. . |
| 5,902,617 | 5/1999 | Pabst ........................................ 426/801 |

FOREIGN PATENT DOCUMENTS

| | | | |
|---|---|---|---|
| 0990168 | 1/1983 | U.S.S.R. ................................ | 426/801 |

OTHER PUBLICATIONS

MeadJohnson Nutritionals, "Pediatric Products Handbook", pp. 13–15, 23–25, 1995.

*Primary Examiner*—Helen Pratt
*Attorney, Agent, or Firm*—Kenyon & Kenyon

[57] ABSTRACT

A milk based formula for premature infants has been discovered. The formula has a reduced lactose content, preferably less than 20%. Premature and low birth-weight infants fed the infant formula demonstrate improved feeding tolerance.

24 Claims, No Drawings

NUTRITIONAL FORMULA FOR PREMATURE INFANTS AND METHOD OF MAKING

This application claims benefit of provisional application Ser. No. 60/094,399 filed Jul. 28, 1998.

FIELD OF THE INVENTION

This invention relates to an infant formula for premature or low birth weight infants, and in particular, a low lactose-containing infant formula.

BACKGROUND OF THE INVENTION

It has been determined that premature infants have a greatly decreased lactase activity until approximately thirty-six weeks of gestation when there is a rapid increase to newborn levels, as described in Kien, C. L.: *Colic Fermentation of Carbohydrate in the Premature Infant: Possible Relevance to Necrotizing Enterolcolitis. J. Pediatr.* 117 (suppl): S52–S58, 1990. Past and current infant formulas designed for premature infants contain lactose at levels of at least 40% lactose, such as present in *Enfamil® Premature Formula* (Mead Johnson Nutritionals, Evansville, Ind., U.S.A.). The remainder of the carbohydrate fraction is typically available in the form of glucose polymers. With the low amounts of lactase present in the immature intestine of premature infants, there may be excess carbohydrate whose fermentation results in the formation of hydrogen gas and possible development of pneumatosis intestinalis, the pathologic hallmark of necrotizing enterocolitis.

In addition, premature infants frequently have episodes of feeding intolerance possible secondary to lactose intolerance. During these episodes, neonates present with abdominal distension, gastric retention of feedings, diarrhea, and sometimes guaiac positive stools, as described in Walsh, M. C., Kleigman, R. M.: *Necrotizing Enterocolitis: Treatment Based on Staging Criteria. Pediatr Clin North AM* 33:179–201, 1986.

Alternative infant formulas designed specifically for premature babies are needed.

SUMMARY OF THE INVENTION

In one aspect of the present invention there is provided an infant formula for premature infants or low birth weight infants comprising (a) milk protein; (b) lipid; and (c) carbohydrates comprising less than about 20 weight percent lactose, said weight percent based on the total weight of the carbohydrates present in the formula, wherein said infant formula has a minimum caloric value of at least about 20 Calories per fluid ounce and said milk protein is present in an amount ranging from 2.4 to 3.6 g per 100 Calories. In preferred embodiments of this aspect of the invention, the lactose present in the formula comprises less than about 10%, and most preferably, less than about 5% of the total carbohydrate present in the formula, based on the total weight of carbohydrates in the formula. In another preferred embodiment, the carbohydrates present in the formula comprise maltose, most preferably high maltose corn syrup solids.

In another aspect of the invention, there is provided a method for ameliorating or preventing feeding intolerance in premature or low birth-weight infants, said method comprising feeding said infant an infant formula comprising (a) milk protein; (b) lipid; and (c) carbohydrates comprising less than about 20 weight percent lactose, said weight percent based on the total weight of the carbohydrates present in the formula, wherein said infant formula has a minimum caloric value of at least about 20 Calories per fluid ounce and said milk protein is present in an amount ranging from 2.4 to 3.6 g per 100 Calories.

DETAILED DESCRIPTION OF THE INVENTION

An alternative human infant formula for premature infants has been discovered. Unexpectedly, the premature infants who were fed the inventive infant formula demonstrated improved caloric intake and weight gain and fewer signs of feeding intolerance, as compared with infants fed with traditional premature formulas having 40% or greater lactose fraction of the carbohydrate component of the infant formula. The inventive infant formula composition comprises (a) a milk protein source; (b) a lipid source; and (c) a carbohydrate source comprising less than about 20 weight % lactose, preferably less than about 10 weight % and more preferably less than about 5 weight % lactose, the weight percentages based on the total weight of the carbohydrate source, wherein said infant formula has a minimum caloric value equal to or greater than 20 Calories per fluid ounce. The infant formula of the present invention has unexpectedly shown a 15 to 20% improvement in tolerance by premature infants as compared to prior art infant formulas containing greater amounts of lactose. Thus, the infant formula of the present invention is useful for ameliorating or preventing feeding intolerance in premature infants or low birth weight infants.

The infant formula composition of the invention is preferentially prepared as a 20 Calories/fl. oz–24 Calories/fl. oz formula (most preferably 24 Calories/fl. oz. when the infant demonstrates the ability to intake high calorie infant formula) with a suitable osmolality for feeding infants, as shown in Table 1 below (Osmolality Units: mOsm/kg water).

TABLE 1

|  | 20 Cal/oz | 24 Cal/oz |
|---|---|---|
| Acceptable Range | 140–340 | 160–400 |
| Preferred: | 170–320 | 190–380 |
| More Preferred: | 200–300 | 230–360 |
| Most Preferred: | 230–280 | 250–330 |

The osmolality within preferred ranges is targeted to improve the infant's feeding tolerance of the formula.

The infant formula of the present invention may be prepared as a powder or liquid nutritional composition as either a sole source of nutrition or a dietary supplement for premature infants. The invention provides a commercially acceptable product in terms of desired stability and physical characteristic.

The infant formula of the invention provides a premature infant formula having a carbohydrate component that is comprised of a substantially reduced amount of lactose (milk sugar) as compared to premature formulas currently available. The lactose may be reduced by replacing the carbohydrate fraction with another suitable carbohydrate such as appropriate polysaccharides, disaccharides, and monosaccharides. Particularly useful are glucose polymers or mixed glucose/fructose polymers such as those found in corn, rice, sorghum, tapioca, barley, and the like. For ease of formulation, because lactose is a disaccharide, other disaccharides may be selected as a portion of the replacement carbohydrate fraction to avoid osmolality issues. Preferred substitutes for the lactose include corn syrup solids or sucrose, and most preferably, high maltose corn syrup solids or maltose.

Alternatively, a reduced concentration of lactose can be achieved in the present infant formula by treating a lactose containing infant formula with a sufficient amount of lactase to reduce the amount of lactose in the formula. The lactase treated formula contains less than about 20%, preferably less than about 10% and most preferably less than about 5% lactose.

The milk protein component of the present infant formula may be selected from any appropriate source for premature infants which has a whey content ranging from about 18 to about 100% of the protein. In general, protein levels of premature formulas are of a higher level than in formulas intended for full term infants in order to meet the unique nutritional needs of a rapidly growing, low-birth-weight infant. Preferably the protein is obtained from cow's milk, (preferably 60 whey protein:40 casein protein), but may be obtained from any acceptable mammalian source, in an amount ranging from approximately 2.4 g to about 3.6 g, preferably from about 2.6 to 3.3, and most preferably about 3 g of protein per 100 Calories.

The lipid or fat component of the present infant formula may be any FDA approved natural and/or synthetic oil that is edible and acceptable for use in infant formula compositions, employed in an amount suitable for the desired nutritional balance for the premature infant formulas. Suitable fat sources include medium chain triglycerides (MCT), synthetic and vegetable oils, including but not limited to palm olein, soy, coconut, high oleic safflower and high oleic sunflower oils and the like, as well known in the art.

The inventive composition may be formulated with minerals and vitamins at nutrient levels generally used in premature infant formulas, such as the levels of *Enfamil® Premature Formula,* described in Mead Johnson Nutritionals Pediatric Products Handbook, Published 1995, pp. 24 (hereby incorporated by reference). calcium levels are preferably between about 80 and about 220 mg per 100 Calories, more preferably between about 100 and about 200 mg per 100 Calories, and most preferably between about 120 and about 170 mg per 100 Calories. The calcium to phosphorus ratio is preferably between about 1.7:1 and about 2.1:1 and most preferably about 2:1.

When the formula is manufactured as a finished product, preservatives, such as potassium sorbate, and emulsifiers, such as polysorbate and soy phosphatates, may be added, thereby reducing the ability of the composition to support growth of contaminating microorganisms while in powder form or in solution and and making the dissolution or emulsification of the formula easier.

While some lactose may be present in the infant formula (up to about 20% of total carbohydrate fraction), preferably the formula will contain less than 10% lactose, more preferably less than about 5% lactose.

The formulas may be prepared to feed the premature infant (typically identified as an infant born prior to 37 weeks gestation) or low birth-weight infant (typically identified as having a birth-weight less than 2500 grams) until the infant is discharged from the hospital or weighs anywhere from about 2500 to about 3000 grams, and in some cases more as determined by the infant's physician. The present low lactose infant formula may be provided to the infant as often as needed. Generally, the premature infant is provided the infant formula of the invention in a manner similar to use of other premature infant formulas. The infant formula of the invention initially is typically provided as a 20 Calories/fl. oz. formula for a period of time as needed and thereafter prepared as a 24 Calories/fl. oz. formula, as needed.

The present low lactose infant formula may be provided as a ready-to-use (RTU) premature infant formula containing less than about 20% lactose, preferably less than about 5% lactose. As used herein, a ready-to-use product is a 24 Calorie per fluid ounce liquid "ready to feed" product, which requires no reconstitution prior to feeding. In general, the nutrient profile for the present infant formula is about 2–5, preferably about 3 grams protein; about 3–6, preferably about 5.1 grams fat; and about 6–15, preferably about 9–13 and most preferably about 11.1 grams carbohydrates per 100 Calories. The osmolality of the ready-to-use products used herein is generally between about 260 and about 290 mOsm/kg water. Alternatively, the present infant formula may be provided as a powder, which is reconstituted by the consumer by addition of a predetermined amount of water, which will provide the desired osmolality.

In one embodiment of the present invention, lactose, which is typically used in infant formulas is functionally replaced with maltose. The carbohydrate used in the present infant formula is preferably made from a mixture of corn syrup, corn syrup solids, maltose, and/or sucrose or any of these sugars alone.

In a most preferred infant formula, total milk protein is used in place of non-fat milk solids, which are used in most infant formulas and a lactase-treated low lactose whey protein concentrate from New Zealand dairy products is used. Some residual lactose (<5%) may be present in the present infant formula. Preferably, a blend of total milk protein concentrate is used to attain a whey-casein ratio of about 60:40.

Calcium glucanate, calcium glycerol phosphate, calcium carbonate, and the like may be used in the present formula as a source of calcium and/or phosphate. Commercial tricalcium phosphate is preferably included in the present infant formula. Adjustments may be made to compensate for mineral contribution from the raw materials used to generate the present infant formula. To attain a desirable osmolality of the present infant formula, a corn syrup:disaccharide ratio of about 70:30 to about 60:40 and most preferably, about 62:38 is used.

The infant formula according to the invention may be made in any convenient manner.

The following examples are provided for purposes of illustration only and are not intended to be limiting.

EXAMPLE 1

An infant formula having the following nutrient profile was prepared by admixing the following ingredients in the specified amounts:

| NUTRIENT | PER 100 Calories (5 fluid ounces) |
|---|---|
| Protein (g): | 3 |
| Whey Protein | 1.5 |
| Total Milk Protein | 1.5 |
| Fat (g) | 5.1 |

-continued

| NUTRIENT | PER 100 Calories (5 fluid ounces) |
|---|---|
| Carbohydrate (g): | 11.1 |
| Corn Syrup Solids | 7.1 |
| Maltose | 3.9 |
| Lactose | Trace |
| Water (g) | 133 |
| Linoleic Acid (mg) | 1060 |
| Vitamins: | |
| Vitamin A (I.U.) | 1250 |
| Vitamin D (I.U.) | 270 |
| Vitamin E (I.U.) | 6.3 |
| Vitamin K (I.U.) | 8 |
| Thiamine (µg) | 200 |
| Riboflavin (µg) | 300 |
| Vitamin B$_6$ (µg) | 150 |
| Vitamin B$_{12}$ (µg) | 0.25 |
| Niacin (µg) | 4000 |
| Folic Acid (µg) | 35 |
| Pantothenic Acid (µg) | 1200 |
| Biotin (µg) | 4 |
| Vitamin C (mg) | 20 |
| Choline (mg) | 12 |
| Inositol (mg) | 17 |
| Minerals: | |
| Calcium (mg) | 165 |
| Phosphorus (mg) | 83 |
| Magnesium (mg) | 6.8 |
| Iron (mg) | 0.25 |
| Zinc (mg) | 1.5 |
| Manganese (µg) | 6.3 |
| Copper (µg) | 125 |
| Iodine (µg) | 25 |
| Sodium (mg) | 39 |
| Potassium (mg) | 103 |
| Chloride (mg) | 85 |

The composition of the infant formula included water, nonfat milk, maltose, corn syrup solids, medium chain triglycerides (fractionated coconut oil), soy oil, lactase-treated low lactose whey concentrate, coconut oil, mono- and diglycerides, carrageenan, and less than about 2% of each of the following: vitamins (vitamin A palmitate, vitamin D$_3$, dl-alpha-tocopheryl acetate, phytonadione, thiamine hydrochloride, riboflavin, pyridoxine hydrochloride, vitamin B$_{12}$, niacinamide, folic acid, calcium pantothenate, biotin, sodium ascorbate, choline chloride, inositol), minerals (calcium carbonate, calcium chloride, calcium phosphate, ferrous sulfate, zinc sulfate, cupric sulfate, potassium iodide, sodium citrate, potassium chloride, potassium citrate), taurine and L-carnitine.

The above-listed ingredients were homogeneously mixed to formulate a fluid ounce ready-to-use low lactose infant formula (LL EPF).

EXAMPLE 2

In a clinical study carried out in a neonatal intensive care unit, premature infants were fed either the standard premature infant formula (Enfamil® Premature Formula (EPF) or a low lactose infant formula (a low lactose-containing Enfamil® Premature Formula containing maltose in place of lactose (LL EPF). Clinical investigators randomized three hundred and six (306) admissions to a neonatal intensive care unit who were <1800 grams and <36 weeks to receive Enfamil® Premature Formula (EPF) 24 Calories/oz or the low lactose infant formula of the invention (LL EPF). The LL EPF was comparable to EPF 24 Calories/oz except for the replacement of lactose with maltose. All infants were on the same protocol for advancement of feeds. Caretakers were blind to the study assignment. Complete data for two hundred and ninety nine (299) study infants, ninety eight (98) of whom received some human milk were gathered. Data for the 299 infants who received EPF (n=149) or LL EPF (n=150) were examined. The mean duration of study enrollment was 1 month (31.3 days). Groups were comparable for birth weight (1167 vs. 1130 g), gestational age (30 weeks for each group), and day of first feed (8.2 vs. 7.8). Data are mean (S.D.).

Feeding intolerance was defined by the presence of abdominal distention (increase in girth), gastric retention of feedings, diarrhea, guaiac positive stools, abnormal abdominal radiograph (intestinal distention, ileus), or bilious emesis. The diagnosis of necrotizing enterocolitis (NEC) was based on either the radiologic finding of pneumatosis intestinalis, or portal venous gas, or characteristic histopathologic findings on specimens obtained at surgery or autopsy. The infants with suspected NEC were of sufficient concern to warrant being kept NPO (nothing per os) and given antibiotics for seven to ten days. The diagnosis of NEC and suspected NEC was determined before knowing which infants received EPF or low lactose EPF.

Infants did not begin oral or nasogastric feedings until the umbilical arterial and/or venous catheters were removed, if present. Feedings began at the discretion of the attending neonatologist. Study infants were placed on a standardized feeding schedule according to weight at the onset of feedings. The study provided that feedings would be stopped or altered at the discretion of the attending neonatologist if there were clinical indications of feeding intolerance or necrotizing enterocolitis.

Infants were on the same protocol for feeding advancement with a goal of achieving 120 Calories/kg/day. Infants <700 grams received trophic feeds of 1 mL/kg every 4 hours for 4 days. Infants <1000 grams were started at 1 mL/kg/hr and advanced by 1 mL/kg every 24 hours. Infants 1000–1250 grams were started at 2 mL/kg every 2 hours and advanced by 1 mL/kg every 12 hours. Infants weighing from 1251 to 1800 grams were started at 2 mL/kg every 3 hours and advanced by 1 mL/kg every 8 hours.

Demographic variables for all study infants and measured feeding variables including enteral caloric intake, weight gain, days required to reach full feeds, the amount of gastric residual before each feeding, the amount of time spent NPO, and the number of times that feedings were stopped were recorded. The number of days to reach 115 Calories/kg/day was used as a standard for determining the number of days required to reach full feeding.

Statistical analysis was performed on data obtained for both groups. The multivariate rank sum test was used to evaluate the feeding outcome variable.

It was found that infants who received the low lactose infant formula of the invention (LL EPF) had improved caloric intake and weight gain and fewer signs of feeding intolerance. Two general parameters were investigated in the study, feeding intolerance and incidence of necrotizing enterocolitis. While it was concluded that infants who had been fed the low lactose infant formula of the invention had a greater daily enteral caloric intake, less gastric residual and fewer feedings stopped, the incidence of necrotizing enterocolitis (NEC) was too low to draw conclusions. Results are summarized in Table 2 below.

TABLE 2

|  | EPF | LL EPF |
|---|---|---|
| Enteral Caloric Intake (Calories/kg/day) | 67.5 | 73.3 |
| Gastric Residual (mL/day) | 3.25 | 2.7 |
| Feedings Stopped/Day | 0.09 | 0.07 |
| Percent Time NPO | 11% | 9% |
| Weight Gain (g/day) | 16.5 | 19.1 |
| Days To Full Feeds | 16 | 13 |
| NEC* | 13 | 14 |

*the difference observed between the two groups was not statistically significant
p = 0.014 for all parameters (except NEC)

That which is claimed is:

1. A formula for premature or low birth weight infants, comprising (a) milk protein; (b) lipid; and (c) carbohydrates comprising less than about 20 weight percent lactose, said weight percent based on the total weight of the carbohydrates present in the formula, wherein said infant formula has a minimum caloric value of at least about 20 calories per fluid ounce and said milk protein is present in and amount ranging from 3 to 3.6 g per 100 calories.

2. A composition according to claim 1 wherein the lactose is present in an amount of less than about 10 weight percent of the carbohydrate.

3. A composition according to claim 1 wherein the lactose is present in an amount of less than about 5 weight % of the carbohydrate.

4. A composition according to claim 3 wherein said formula has a caloric value of about 24 Calories per fluid ounce.

5. A composition according to claim 1 wherein said formula has an osmolality in the range of from about 140 to about 400 mOsm/kg water.

6. A composition according to claim 1 wherein said formula has an osmolality in the range of from about 170 to about 380 mOsm/kg water.

7. A composition according to claim 1 wherein said formula has an osmolality in the range of from about 200 to about 360 mOsm/kg water and said milk protein is cow milk protein.

8. A composition according to claim 7 wherein said milk protein is present in an amount of from 2.6 to 3.3 g. per 100 Calories.

9. A composition according to claim 8 wherein said composition has nutrient levels comprising about 3 grams protein; about 5.1 grams fat; and about 11.1 grams carbohydrate per 100 Calories.

10. A composition according to claim 1 wherein the carbohydrates comprise glucose, or a mixture of glucose and fructose.

11. A composition according to claim 10 wherein the carbohydrates comprise a mixture of maltose and corn syrup solids.

12. A composition according to claim 10 wherein the carbohydrates comprise maltose.

13. A composition according to claim 10 wherein said carbohydrate is high maltose corn syrup solids.

14. A composition according to claim 10 wherein said carbohydrate is a glucose.

15. A composition according to claim 10 wherein said formula comprises a milk protein to whey protein ratio of about 60:40.

16. A composition according to claim 10 wherein said formula is a ready-to-use infant formula.

17. A composition according to claim 10 wherein said formula is a powder.

18. A composition according to claim 10 wherein said formula has a calcium concentration of from about 100 to about 200 mg per 100 Calories.

19. A composition according to claim 10 wherein said formula has a calcium to phosphorus ratio of about 2:1.

20. A method for ameliorating or preventing feeding intolerance in premature or low birth-weight infants, said method comprising feeding said infant an infant formula comprising (a) milk protein; (b) lipid; and (c) carbohydrates comprising less than about 20 weight percent lactose, said weight percent based on the total weight of the carbohydrates present in the formula, wherein said infant formula has a minimum caloric value of at least about 20 Calories per fluid ounce and said milk protein is present in an amount ranging from 2.4 to 3.6 g per 100 Calories.

21. A method according to claim 20, wherein the carbohydrates comprise glucose, or a mixture of glucose and fructose.

22. A method according to claim 21 wherein the carbohydrates comprise maltose.

23. A method according to claim 20, wherein the milk protein is present in an amount of from about 2.6 to about 3.3 grams per 100 Calories.

24. A method according to claim 20, wherein said formula has nutrient levels comprising about 3 grams protein; about 5.1 grams fat; and about 11.1 grams carbohydrate per 100 Calories.

* * * * *